(12) United States Patent
Li et al.

(10) Patent No.: US 11,674,437 B2
(45) Date of Patent: Jun. 13, 2023

(54) GAS TURBINE POWER GENERATION DEVICE

(71) Applicant: XI'AN THERMAL POWER RESEARCH INSTITUTE CO.LTD, Shaanxi (CN)

(72) Inventors: Xiaofeng Li, Shaanxi (CN); Junfeng Xiao, Shaanxi (CN); Song Gao, Shaanxi (CN); Wei Wang, Shaanxi (CN); Feng Wang, Shaanxi (CN); Mengqi Hu, Shaanxi (CN); Lin Xia, Shaanxi (CN)

(73) Assignee: XI'AN THERMAL POWER RESEARCH INSTITUTE CO. LTD, Shaanxi (CN)

( * ) Notice: Subject to any disclaimer, the term of this patent is extended or adjusted under 35 U.S.C. 154(b) by 0 days.

(21) Appl. No.: 17/740,535

(22) Filed: May 10, 2022

(65) Prior Publication Data

US 2022/0275754 A1 Sep. 1, 2022

Related U.S. Application Data

(63) Continuation of application No. PCT/CN2020/126712, filed on Nov. 5, 2020.

(30) Foreign Application Priority Data

Jun. 3, 2020 (CN) .................... CN202010496798.9

(51) Int. Cl.
*F02C 6/00* (2006.01)
*F02C 3/04* (2006.01)
*F23R 3/28* (2006.01)

(52) U.S. Cl.
CPC ................. *F02C 6/00* (2013.01); *F02C 3/04* (2013.01); *F23R 3/28* (2013.01); *F05D 2220/76* (2013.01); *F05D 2240/35* (2013.01)

(58) Field of Classification Search
CPC ...... F02C 6/00; F02C 3/04; F02C 5/00; F02C 5/12; F23R 3/28; F23R 7/00;
(Continued)

(56) References Cited

U.S. PATENT DOCUMENTS 3,638,865 A * 2/1972 McEneny ................. F23R 3/28
239/404
4,178,754 A * 12/1979 Earnest .................... F01K 23/10
60/773

(Continued)

FOREIGN PATENT DOCUMENTS

CN 102817799 12/2012
CN 109162811 1/2019

OTHER PUBLICATIONS

WIPO, International Search Report for International Application No. PCT/CN2020/126712, dated Feb. 25, 2021.

*Primary Examiner* — Loren C Edwards
(74) *Attorney, Agent, or Firm* — Hodgson Russ LLP

(57) ABSTRACT

A gas turbine power generation device includes: an inlet pipe (1), a compressor (2), an air storage compartment (3), a compressor rotor (4), a compressor gear shift (6), a compressor exhaust pipeline (8), a combustion chamber intake pipeline (10), a combustion chamber intake cone (11), a combustion chamber pneumatic valve (14), a spark plug (19), a combustion chamber (21), a Tesla turbine (22), a gas collection compartment (27), an outlet pipe (28), a turbine rotor (30), a generator gear shift (32) and a generator (33).

20 Claims, 1 Drawing Sheet

(58) Field of Classification Search
CPC .... F05D 2220/76; F05D 2240/35; F01D 1/32; Y02T 10/12; F02K 7/02
See application file for complete search history.

(56) References Cited

U.S. PATENT DOCUMENTS

| | | | | |
|---|---|---|---|---|
| 6,512,305 | B1 * | 1/2003 | Pinkerton | H02K 7/025 |
| | | | | 290/46 |
| 9,810,102 | B2 * | 11/2017 | Eramaa | F01K 23/10 |
| 2004/0128974 | A1 * | 7/2004 | Laper | F02C 5/02 |
| | | | | 60/39.6 |

* cited by examiner

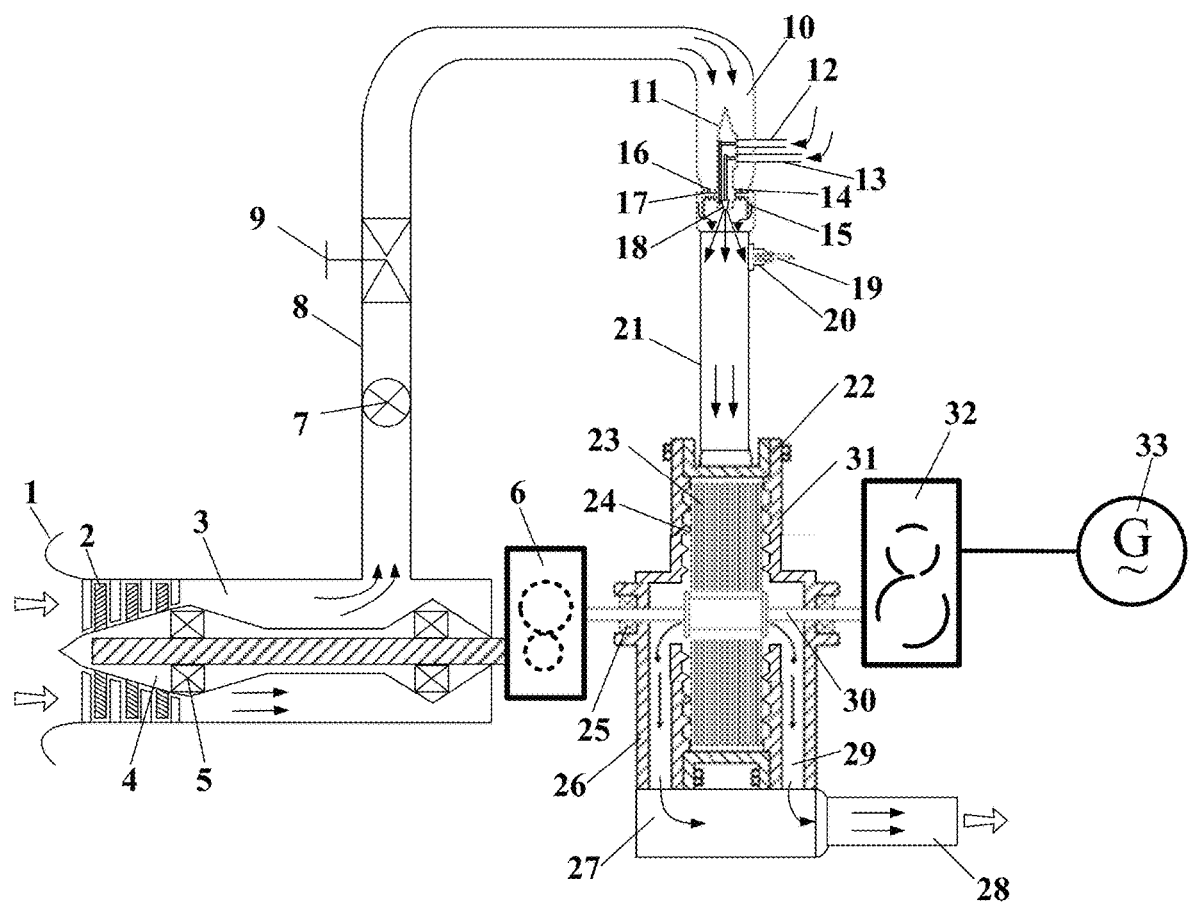

GAS TURBINE POWER GENERATION DEVICE

CROSS-REFERENCE TO RELATED APPLICATIONS

This application is a continuation of International Application No. PCT/CN2020/126712, filed Nov. 5, 2020, which claims priority to and benefits of Chinese Patent Application No. 202010496798.9, filed Jun. 3, 2020, the entire contents of which are incorporated herein by reference.

FIELD

The present disclosure relates to a field of electric generators, and more particularly to a gas turbine generator.

BACKGROUND

Isobaric combustion refers to a combustion that a combustible mixture is heated by heat conduction, heat diffusion and heat radiation to cause a chemical reaction, and has a slow flame propagation speed, normally lower than 1 m/s. The isobaric combustion generally is used for a constant pressure combustion chamber for power devices, such as ground-based gas turbines, marine gas turbines, aero engines or missile engines. Fuels burn in the constant pressure combustion chamber, and a gas pressure therein is basically unchanged or slightly reduced during the combustion process. The properties of this kind of power devices have been developed to a mature stage. A cycle thermal efficiency of the existing power device depends on a pressure ratio (i.e., a ratio of a boost pressure to an initial pressure) of a compressor. Theoretically speaking, the higher the pressure ratio is, the higher the cycle thermal efficiency is. However, with the increase of the pressure ratio of the compressor of the power device, an initial temperature of air entering the combustion chamber increases significantly, but an inlet temperature of the turbine in the power device has a limit due to limitation of its material nature, resulting in a significant drop of the heat of the combustion chamber and a reduction of the output power of the power device.

SUMMARY

The present disclosure provides a gas turbine power generation device, including: an inlet pipe for allowing air to flow in the gas turbine power generation device; a compressor, connected to the inlet pipe and having a compressor rotor; an air storage compartment, located downstream of the compressor; a compressor gear shift, having a left end connected to the compressor rotor and a right end connected to a turbine rotor; a compressor exhaust pipeline, connected to the air storage compartment; a combustion chamber intake pipeline, connected to the compressor exhaust pipeline; a combustion chamber intake cone, located in the combustion chamber intake pipeline; a combustion chamber pneumatic valve, located on the combustion chamber intake cone; a combustion chamber, connected to the combustion chamber intake pipeline, and having a head provided with a spark plug; a Tesla turbine, located at an outlet of the combustion chamber; a gas collection compartment, located on a side of the Tesla turbine; an outlet pipe, connected to the gas collection compartment; a generator; and a generator gear shift, having a left end connected to the turbine rotor and a right end connected to the generator.

In an embodiment, the Tesla turbine includes: a turbine power disk, having a group of equally spaced circular plates with equal diameter and equal thickness; the turbine rotor, connected to the circular plates through ribs between fan-shaped exhaust holes formed in centers of the circular plates; a turbine exhaust gas casing, provided with a turbine bearing mounting seat; a turbine gas casing, having a cylindrical compartment with sealing grate teeth for preventing detonation gas from leaking to a turbine exhaust passage formed by the turbine exhaust gas casing and the turbine gas casing; the gas collection compartment, located on an exhaust side of the Tesla turbine; and the turbine exhaust passage, communicated with the gas collection compartment.

In an embodiment, the gas turbine power generation device is configured to: suck air into the gas turbine power generation device by the compressor to compress and pressurize the air, and introduce the compressed and pressurized air into the air storage compartment; feed the compressed and pressurized air into the combustion chamber through the compressor exhaust pipeline and the combustion chamber pneumatic valve in the combustion chamber intake pipeline; feed a fuel into the combustion chamber intake cone in the combustion chamber intake pipeline by a fuel supplying pipeline; atomize the fuel in a conical swirl nozzle at a tail of the combustion chamber intake cone, and inject the atomized fuel into the combustion chamber; form a combustible mixture after the air and the fuel are filled in the combustion chamber; form a detonation combustion wave by igniting the combustible mixture via the spark plug at the head of the combustion chamber; generate a detonation gas by burning the combustible mixture with the detonation combustion wave propagating at a supersonic speed in the combustion chamber; inject the detonation gas into the Tesla turbine; generate turbine power by rotating the turbine power disk via a viscous force of the detonation gas; discharge an exhausted gas out of the gas turbine through the turbine exhaust passage, the gas collection compartment and the outlet pipe; and output the turbine power to the compressor and the generator in a form of a shaft power.

In an embodiment, a stage level of the compressor is 2 to 3, and the compressor has a pressure ratio of 3 or less.

In an embodiment, the compressor includes: the compressor rotor, having a cantilever end; compressor blades, located on the cantilever end of the compressor rotor; and a compressor rotor bearing, located on an inner cylinder of the air storage compartment.

In an embodiment, the air storage compartment includes: an inlet, an expanding annular channel that begins at the inlet and is configured to decelerate and pressurize an air flow from an outlet of the compressor; and an annular cavity with a constant cross-section, configured to store compressed air discharged from the compressor.

In an embodiment, the compressor exhaust pipeline is a metal round pipeline, and includes a compressed air flow meter and an air flow controlling valve.

In an embodiment, the air flow controlling valve is configured to control an air flow according to a loading of the gas turbine power generation device.

In an embodiment, the combustion chamber intake pipeline has a cavity with a rectangular cross section for introducing air, and the combustion chamber intake cone and the combustion chamber pneumatic valve are located in the combustion chamber intake pipeline.

In an embodiment, the combustion chamber intake cone includes: a conical head; a cylindrical main body; an atomizing air flow channel; a fuel flow channel; and a conical swirl nozzle, communicated to an atomizing air inlet tube via the atomizing air flow channel, and communicated to a fuel supplying pipeline via the fuel flow channel.

In an embodiment, the combustion chamber intake cone is configured to provide a fuel into the combustion chamber.

In an embodiment, the conical swirl nozzle is configured to break a liquid fuel into droplets under a shearing action of an atomizing air, and spray the droplets into the combustion chamber.

In an embodiment, the combustion chamber pneumatic valve is located at an end of the combustion chamber intake cone, and includes: an intake orifice plate, having a rectangular plate formed with a plurality of air intake holes evenly and equally spaced; a detonation wave cut-off plate, having a rectangular plate; and an intake cup, having a rectangular cavity with an opening an one end and holes at the other end.

In an embodiment, when the combustion chamber is filled with fresh air and fuel by the combustion chamber pneumatic valve, the detonation wave cut-off plate moves to a downstream direction of airflow under an action of an intake pressure until it is stopped by the intake cup, the holes of the intake cup are covered and sealed.

In an embodiment, a cavity is formed by a side wall of the intake cup and the combustion chamber intake pipeline to allow the fresh air to be injected to the combustion chamber.

In an embodiment, a detonation combustion back-propagation wave is generated in the combustion chamber, the detonation combustion back-propagation wave propagates upstream to the combustion chamber intake pipeline, the detonation wave cut-off plate moves to an upstream direction of airflow under an action of a pressure of the detonation combustion back-propagation wave until it is stopped by the intake orifice plate, and the air intake holes in the intake orifice plate are covered and sealed.

In an embodiment, the combustion chamber has a straight tube cavity having a rectangular cross section, and is provided with a spark plug mounting seat for installing the spark plug, and configured to fill and mix air and a fuel to form a combustible mixture.

In an embodiment, the spark plug is configured to ignite the combustible mixture to generate a detonation combustion wave in a propagation direction of airflow.

In an embodiment, the outlet pipe has a straight circular nozzle, and is configured to discharge exhausted gas.

The present disclosure further provides a gas turbine power generation method performed by the gas turbine power generation device as described above.

BRIEF DESCRIPTION OF THE DRAWINGS

FIG. 1 is a schematic diagram showing a gas turbine power generation device in some embodiments of the present disclosure.

REFERENCE NUMERALS

1: inlet pipe; 2: compressor; 3: air storage compartment; 4: compressor rotor; 5: compressor rotor bearing; 6: compressor gear shift; 7: compressed air flow meter; 8: compressor exhaust pipeline; 9: air flow controlling valve; 10: combustion chamber intake pipeline; 11: combustion chamber intake cone; 12: atomizing air inlet tube; 13: fuel supplying pipeline; 14: combustion chamber pneumatic valve; 15: intake cup; 16: intake orifice plate; 17: detonation wave cut-off plate; 18: conical swirl nozzle; 19: spark plug; 20: spark plug mounting seat; 21: combustion chamber; 22: Tesla turbine; 23: turbine power disk; 24: sealing grate teeth; 25: turbine bearing; 26: turbine exhaust gas casing; 27: gas collection compartment; 28: outlet pipe; 29: turbine exhaust passage; 30: turbine rotor; 31: turbine gas casing; 32: generator gear shift; 33: generator.

DETAILED DESCRIPTION

For a better understanding of the present disclosure, and making technical solution of the present disclosure more clear, the present disclosure will now be described by way of embodiments with reference to the drawing. It should be clarified that the embodiments described are only a part of embodiments of the present disclosure, and are not all of the embodiments thereof, which shall not be construed to limit the scope of the present disclosure. In addition, well-known structures and technologies are omitted in order to avoid obscuring the concepts of the present disclosure. Other embodiments obtained by those skilled in the art based on the embodiments of the present disclosure without creative efforts shall fall within the protection scope of the present disclosure.

The drawing shows a schematic structure of components according to some embodiments of the present disclosure. The components in the drawing may be not entirely illustrated according to the proportional scale. In order to show the structure clearly, details of some components may be enlarged and details of some other components may be omitted. The illustrated shapes of various regions and layers in the drawing and their relative sizes and positional relationships are only exemplary. In practice, there may be deviations due to manufacturing tolerances or technical limitations, and those skilled in the art may additionally design regions/layers with different shapes, sizes, and relative positions according to actual needs.

In the context of the present disclosure, when a layer/element is referred to as being "above" another layer/element, it can be directly on the other layer/element or intervening layers/elements may be present therebetween. In addition, if a layer/element is "above" another layer/element in one orientation, then when the orientation is reversed, the layer/element may be "below" the other layer/element.

It should be noted that the terms "first", "second" and the like in specification and in claims, are used for distinguishing between similar elements and not necessarily for describing a sequential or chronological order. It is to be understood that the terms so used are interchangeable under appropriate circumstances and that the embodiments described herein are capable of operation in other sequences than described or illustrated herein. Furthermore, the terms "comprising" and "including" and any variations thereof, are intended to cover a non-exclusive inclusion. For example, a process, method, system, product or device including a series of operations or units is not necessarily limited to those operations or units expressly listed, but may also include operations or units not expressly listed or inherently owed by such a process, method, product or device.

Detonation refers to a combustion that a combustible mixture is compressed adiabatically by guiding shock waves, to generate a high temperature and high pressure ignition zone to let a violent chemical reaction happen therein. The guiding shock waves may be maintained and further propagated by the energy released by the chemical reactions, and the guiding shock waves and the released energy may be promoted by each other. The detonation combustion is induced by the shock wave compression, and a flame propagation speed is extremely fast, usually in an order of $10^3$ m/s. In addition, when the combustible mixture is combusted to release the heat, the gas pressure is increased. That is, the detonation has characteristics of a high propagation speed and self-pressurization, which may be used for developing a power device to further improve the overall performance of the device. Based on the advantages of detonation combustion, a new type of power devices using pulse detonation is provided in the present disclosure, these power devices replace the constant pressure combustion chamber with the pulse detonation combustion chamber.

The inventors have found that the high-temperature and high-pressure gas generated after the pulse detonation combustion has a strong pulsation characteristic, a highly concentrated gas energy distribution, and a small ratio of a period of high-energy gas to a working cycle, and the turbine under a quasi-steady flow design condition has a low efficiency for converting the energy of the detonation gas. Further, after the pulse detonation wave is formed in the pulse detonation combustion chamber, a pressure at the head of the combustion chamber increases, a combustion compression wave may be reversed into a combustion chamber intake pipeline, which affects a normal operation of the compressor.

Therefore, in order to solve at least one of the above problems to at least some extent, the present disclosure provides a gas turbine power generation device, which is configured to convert the energy of the pulse detonation gas by the viscous force.

In the power generation device of the present disclosure, a Tesla turbine is used as a pulse detonation gas energy conversion component by using a physical viscosity of a flow to realize energy conversion of the flow in the turbine. After a high-speed pulse detonation gas enters the turbine tangentially from a turbine casing to form a spiral streamline in the turbine, a boundary layer is formed between the gas and a turbine blade disk. According to Newton's law of viscosity, the blade disk rotates at a high speed under the viscous force of the gas, and energy obtained from the gas is output in a form of a shaft power. Compared to an axial flow and centripetal turbines used in the existing power devices, the Tesla turbine does not have any blade structure, and thus the unsteady pulse detonation gas may adaptively convert its energy in a way of transient viscous force work in the Tesla turbine, thereby improving energy conversion efficiency of the pulse detonation gas. In addition, the present disclosure provides a pneumatic valve structure that may adaptively follow a change of a working frequency of the pulse detonation combustion chamber based on working characteristics of the pulse detonation combustion chamber, which may be automatically opened and closed according to a difference of an intake pressure and a pressure difference of detonation combustion back-propagation wave, so as to avoid effects of detonation combustion back-propagation wave pressure on the compressor.

The gas turbine power generation device includes an inlet pipe, a compressor, an air storage compartment, a compressor gear shift, a compressor exhaust pipeline, a combustion chamber intake pipeline, a combustion chamber intake cone, a combustion chamber pneumatic valve, a spark plug, a combustion chamber, a Tesla turbine, a gas collection compartment, an outlet pipe, a generator and a generator gear shift. The inlet pipe is located at a front end of the gas turbine. The compressor is connected to the inlet pipe. The air storage compartment is located downstream of the compressor. The compressor exhaust pipeline is connected to the air storage compartment and the combustion chamber intake pipeline. The combustion chamber intake cone is located in the combustion chamber intake pipeline. The combustion chamber pneumatic valve is located on the combustion chamber intake cone. The combustion chamber is connected to the combustion chamber intake pipeline, and has a head provided with the spark plug. The Tesla turbine is located at an outlet of the combustion chamber. The gas collection compartment is located on a side of the Tesla turbine. The outlet pipe is connected to the gas collection compartment. The compressor gear shift has a left end connected to a compressor rotor and a right end connected to a turbine rotor. The generator gear shift has a left end connected to the turbine rotor and a right end connected to the generator.

In some embodiments, the Tesla turbine includes a turbine power disk, a turbine rotor, a turbine exhaust gas casing, a gas collection compartment, a turbine exhaust passage and a turbine gas casing. The turbine power disk has a group of equally spaced circular plates with equal diameter and equal thickness. The circular plate is provided with fan-shaped exhaust holes in center of the circular plate. The turbine rotor is connected to the circular plates through ribs between fan-shaped exhaust holes. The turbine gas casing has a cylindrical compartment with sealing grate teeth. The sealing grate teeth are used for preventing detonation gas from leaking to the turbine exhaust passage formed by the turbine exhaust gas casing and the turbine gas casing. The turbine exhaust gas casing is provided with a turbine bearing mounting seat. The gas collection compartment is located on an exhaust side of the Tesla turbine, and is communicated with the turbine exhaust passage.

In some embodiments, when the gas turbine power generation device is working, air is introduced into the gas turbine by the compressor to compress and pressurize the air, and the compressed and pressurized air is introduced into the air storage compartment. The compressed and pressurized air is fed into the combustion chamber through the compressor exhaust pipeline and the combustion chamber pneumatic valve in the combustion chamber intake pipeline. Fuel is fed into the combustion chamber intake cone in the combustion chamber intake pipeline by a fuel supplying pipeline. The fuel is atomized by a high pressure gas in a conical swirl nozzle at a tail of the combustion chamber intake cone, and injected the atomized fuel into the combustion chamber. A combustible mixture is formed after the air and the fuel are filled in the combustion chamber. A detonation combustion wave is formed by igniting the combustible mixture via the spark plug at the head of the combustion chamber. A detonation gas is generated by burning the combustible mixture with the detonation combustion wave propagating at a supersonic speed in the combustion chamber. The detonation gas is injected into the Tesla turbine at a high speed. Turbine power is generated by rotating the turbine power disk at a high speed via a viscous force of the detonation gas. An exhausted gas is discharged out of the gas turbine through the turbine exhaust passage, the gas collection compartment and the outlet pipe. The turbine power is outputted to the compressor and the generator in a form of a shaft power.

In some embodiments, the inlet pipe and the compressor may be any suitable pipe and compressor, which can be selected in practice. Since the air flow will be compressed at the detonation stage, the compressor may be arranged at a low level, for example a stage level of 2 or 3, and the compressor has a pressure ratio of 3 or less.

In some embodiments, the compressor includes the compressor rotor having a cantilever end. Compressor blades are located on the cantilever end of the compressor rotor, and a compressor rotor bearing is located on an inner cylinder of the air storage compartment.

In some embodiments, the air storage compartment includes an inlet, an expanding annular channel that begins at the inlet and is configured to decelerate and pressurize a subsonic speed air flow from an outlet of the compressor, and an annular cavity. The annular cavity has a constant cross-section and a large capacity, and is configured to store compressed air discharged from the compressor to prevent the compressor from surging when the combustion chamber pneumatic valve is closed.

In some embodiments, the compressor exhaust pipeline is a metal round pipeline, and includes a compressed air flow meter and an air flow controlling valve. The air flow controlling valve is configured to control an air flow according to a loading of the gas turbine power generation device.

In some embodiments, the combustion chamber intake pipeline has a cavity with a rectangular cross section for introducing air, and the combustion chamber intake cone and the combustion chamber pneumatic valve are located in the combustion chamber intake pipeline.

In some embodiments, the combustion chamber intake cone includes a conical head, a cylindrical main body, an atomizing air flow channel, a fuel flow channel and a conical swirl nozzle. The conical swirl nozzle is communicated to an atomizing air inlet tube via the atomizing air flow channel, and communicated to a fuel supplying pipeline via the fuel flow channel.

In some embodiments, the combustion chamber intake cone is a supply structure for atomizing and injecting a liquid fuel, configured to provide a fuel into the combustion chamber, the liquid fuel is broken through the conical swirl nozzle under a shearing action of a high-pressure atomizing air swirling jet to form fine oil droplets, and the droplets are sprayed into the combustion chamber.

In some embodiments, the combustion chamber pneumatic valve may high speed response and adaptively operate, and is located at an end of the combustion chamber intake cone. The combustion chamber includes an intake orifice plate, a detonation wave cut-off plate and an intake cup. The intake orifice plate has a rectangular plate formed with a plurality of air intake holes evenly and equally spaced. The detonation wave cut-off plate has a rectangular plate. The intake cup has a rectangular cavity with an opening at one end and holes at the other end.

In some embodiments, when the combustion chamber is filled with fresh air and fuel by the combustion chamber pneumatic valve, the detonation wave cut-off plate moves to a downstream direction of airflow under an action of an intake pressure until it is stopped by the intake cup, the holes of the intake cup are covered and sealed. The fresh air is injected to the combustion chamber from a cavity formed by a side wall of the intake cup and the combustion chamber intake pipeline.

In some embodiments, when a detonation combustion wave is generated in the combustion chamber, the detonation combustion back-propagation wave propagates upstream to the combustion chamber intake pipeline, the detonation wave cut-off plate moves to an upstream direction of airflow under an action of a pressure of the detonation combustion back-propagation wave until it is stopped by the intake orifice plate, and the air intake holes in the intake orifice plate are covered and sealed.

In some embodiments of the present disclosure, the combustion chamber has a straight tube cavity having a rectangular cross section, and is provided with a spark plug mounting seat for installing the spark plug, and is configured to fill and mix air and a fuel to form a combustible mixture. The spark plug is configured to ignite the combustible mixture to generate a detonation combustion wave in a propagation direction of airflow. The detonation combustion wave may be configured to accelerate the combustion and heat release process of the combustible mixture.

The outlet pipe has a straight circular nozzle, and is configured to discharge exhausted gas.

The compressor gear shift, the generator gear shift and the generator may be any suitable device used in the related art.

In some embodiments, a turbine bearing is located at a turbine bearing mounting seat formed on the turbine exhaust gas casing.

The gas turbine power generation device of the present disclosure utilizes the viscous force of pulse detonation gas to convert the energy of the gas into the shaft energy. The present device adopts the Tesla turbine to extract and convert the pulse detonation gas with strong pulsation and high energy concentration by the gas viscous force. The Tesla turbine is composed of circular thin disks, and has a simple structure without a complex blade structure, which may avoid problems of the existing radial and axial turbine designed for a steady flow condition, such as an angle of attack may significantly affect the device efficiency. Further, considerations of parameters such as the angle of attack and the speed of the strong pulsation gas can be omitted. The Tesla turbine may work adaptively in a whole working cycle without considering changes in the gas intake angle of attack, speed and other parameters of the pulse gas in the working cycle, thereby improving the efficiency of the pulse detonation gas energy conversion and utilization, and improving the energy conversion efficiency. In addition, the present disclosure provides the pneumatic valve structure with a high-speed adaptive response. The pneumatic valve may be automatically opened by a combustion chamber intake pressure difference when the combustion chamber inhales, and the pneumatic valve may be automatically closed by a detonation combustion back-propagation wave when the detonation combustion back-propagation wave propagates to upstream of the combustion chamber. The pneumatic valve may work adaptively according to the working frequency of the pulse detonation combustion, which solves the problems caused by the pressure of the pulse detonation combustion back-propagation wave. In addition, compared with existing gas turbine power generation devices, the power generation device of the present disclosure adopts the pulse detonation combustion chamber. The detonation realizes self-pressurization and high fast flame propagation speed, and the stage level of the compressor in the gas turbine device in the present disclosure may be reduced, thereby reducing the compression work of the compressor, increasing the turbine output power generation, and improving the cycle thermal efficiency of the gas turbine device.

The gas turbine power generation device provided in the present disclosure is capable of converting a low-quality internal energy released by the fuel into a high-quality electric energy by utilizing the viscous force of the pulse detonation gas.

The present disclosure further provides a gas turbine power generation method performed by the gas turbine power generation device as described above.

In some embodiments, the method comprises: sucking air into the gas turbine power generation device, compressing and pressurizing the air by the compressor, and introducing the compressed and pressurized air into the air storage compartment; feeding the compressed and pressurized air into the combustion chamber through the compressor exhaust pipeline and the combustion chamber pneumatic valve in the combustion chamber intake pipeline; feeding a fuel into the combustion chamber intake cone in the combustion chamber intake pipeline by a fuel supplying pipeline; atomizing the fuel in a conical swirl nozzle at a tail of the combustion chamber intake cone, and injecting the atomized fuel into the combustion chamber; forming a combustible mixture after the air and the fuel are filled in the combustion chamber; forming a detonation combustion wave by igniting the combustible mixture via the spark plug at the head of the combustion chamber; generating a detonation gas by burning the combustible mixture with the detonation combustion wave propagating at a supersonic speed in the combustion chamber; injecting the detonation gas into the Tesla turbine; generating turbine power by rotating the turbine power disk via a viscous force of the detonation gas; discharging an exhausted gas out of the gas turbine through the turbine exhaust passage, the gas collection compartment and the outlet pipe; and outputting the turbine power to the compressor and the generator in a form of a shaft power.

It can be understood that features and advantages of the embodiments of the present device are applicable to the embodiments of the method of the present disclosure.

Specific embodiments of the present disclosure will be described in detail below with reference to the drawing.

As shown in FIG. 1, the gas turbine device in the present disclosure includes a compressor rotor 4, an inlet pipe 1, a compressor 2, an air storage compartment 3, a compressor exhaust pipeline 8, a combustion chamber intake pipeline 10, a combustion chamber intake cone 11, a combustion chamber pneumatic valve 14, a combustion chamber 21, a Tesla turbine 22 and an outlet pipe 28. The compressor rotor 4 rotates around a shaft. The air storage compartment 3 is located outside of the compressor rotor 4 and is in a ring shape. Arrows shown in FIG. 1 indicate a path and a direction of an air flow.

Along an airflow direction of the gas turbine device, the inlet pipe 1 is located at the front of the gas turbine device. The compressor 2 is connected to the inlet pipe 1. In some embodiments, due to self-pressurization of the detonation, the compressor 2 may have a small compression ratio, for example, at a stage level of 2 to 3, and the compressor has a pressure ratio of 3 or less. The air storage compartment 3 is located downstream of the compressor 2. The air storage compartment 3 includes an inlet, an expanding annular channel begins at the inlet (the channel has a diameter that gradually increases from a diameter at the inlet), and an annular cavity with a constant cross-section. The compressor exhaust pipeline 8 is provided at a casing of the air storage compartment 3, and provided with a flow meter 7 to measure the compressed air and an air flow controlling valve 9 therein. The air flow controlling valve 9 may be configured to precisely control the air flow into the pulse detonation combustion chamber in real time according to the loading of the gas turbine device. The combustion chamber intake pipeline 10 is located downstream of the compressor exhaust pipeline 8. The combustion chamber intake cone 11 is located in the combustion chamber intake pipeline 10. An atomizing air inlet tube 12 and a fuel supplying pipeline 13 are mounted to a head of the combustion chamber intake cone 11. A combustion chamber pneumatic valve 14 is located at a tail of the combustion chamber intake cone 11. The combustion chamber 21 is connected to the combustion chamber intake pipeline 10, and provided with a spark plug mounting seat 20. The Tesla turbine 22 is located at an outlet of the combustion chamber 21. A gas collection compartment 27 is located on one side of the Tesla turbine 22. The outlet pipe 28 is connected to the gas collection compartment 27. The compressor gear shift 6 has a left end connected to the compressor rotor 4 of the compressor 2 and a right end connected to a turbine rotor 30 of the Tesla turbine 22. A generator gear shift 32 has a left end connected to the turbine rotor 30 and a right end connected to the generator 33.

A working cycle using a power generated by a viscous force of the pulse detonation gas may be divided into three stages, i.e., a filling stage, a combustion stage and an exhausting stage.

In the filling stage, the air of the atmosphere is compressed by the compressor 2 (for example a high-speed rotating compressor) and then is introduced into the air storage compartment 3. The compressed air is injected into the combustion chamber intake pipeline 10 through the compressor exhaust pipeline 8. A detonation wave cut-off plate 17 moves to a downstream direction of the air flow (i.e., downwards in FIG. 1) under the action of an intake pressure until it is stopped by the intake cup 15, and hole(s) of the intake cup 15 is covered and sealed by the plate 17.

The combustion chamber pneumatic valve 14 is opened automatically. In this case, the fresh air enters the combustion chamber 21 from a cavity formed between a side wall of the intake cup 15 and the combustion chamber intake pipeline 10. At the same time, high-pressure atomizing air is introduced into the combustion chamber intake cone 11 through the atomizing air inlet tube 12. A fuel is fed into the combustion chamber intake cone 11 through the fuel supplying pipeline 13. The high-pressure atomizing air is mixed with the fuel in a conical swirl nozzle 18 to form a high-speed rotating shear flow, and the fuel is broken into small oil droplets under the action of the high-speed rotating shear flow. After the fuel is atomized, the fuel is sprayed into the combustion chamber 21 by the conical swirl nozzle 18 at the tail of the combustion chamber intake cone 11. The filling stage is completed after the air and the fuel are fully filled in the combustion chamber 21.

After the filling stage is finished, the combustion stage begins. A control system of the gas turbine device generates an ignition command to ignite the combustible mixture through the spark plug 19. The combustible mixture is ignited and combusted in the combustion chamber very quickly to form a detonation combustion wave, and a pressure at the head of the combustion chamber rises. Under the action of the pressure of the pulse detonation combustion back-propagation wave, the detonation wave cut-off plate 17 moves to an upstream direction of the air flow (i.e., upwards in FIG. 1) until it is stopped by an intake orifice plate 16, and air intake hole(s) of the intake orifice plate 16 is covered and sealed by the plate 17 to prevent the detonation combustion back-propagation wave, and from affecting the operation of the compressor 2. Flame may propagate rapidly in the combustion chamber 21 at a supersonic speed. After the combustible mixture in the combustion chamber 21 is completely burned, the combustion stage is completed.

After the combustion stage is finished, the exhausting stage begins. The pulse detonation gas with strong pulsation and high energy density is sprayed at a high speed from an outlet of the pulse detonation combustion chamber 21 to the Tesla turbine 22, and the pulse detonation gas may be tangentially sprayed into the Tesla turbine 22. Under the action of the viscous force of the high-speed detonation gas, a turbine power disk 23 rotates at a high speed, and exhausted gas, i.e., the gas has provided its power to the turbine, is discharged to a turbine exhaust passage 29 through a passage (e.g., is fan-shaped) in the center of the turbine power disk 23, and then discharged out of the gas turbine device through a gas collection compartment 27 and the outlet pipe 28. The Tesla turbine 22 may extract the energy/power from the detonation gas and output the energy/power to the compressor 2 and the generator 33 in a form of a shaft power. During spraying or injecting the pulse detonation gas out of the combustion chamber 21, a series of expansion waves enter the combustion chamber 21 from the outlet of the combustion chamber 21, and the pressure at the head of the pulse detonation combustion chamber 21 drops until the pressure at the head of the combustion chamber is lower than the intake pressure in the combustion chamber intake pipeline 10, the exhaust stage is finished.

After the exhaust stage is completed, a filling stage of a next cycle beings for the gas turbine device.

In the specification, it is to be understood that terms such as "central," "longitudinal", "lateral", "length", "width", "thickness", "upper", "lower", "front", "rear", "left", "right", "vertical", "horizontal", "top", "bottom", "inner", "outer", "upstream", "downstream", "axial direction", "radial direction" and "tangential" should be construed to refer to the orientation as then described or as shown in the drawing under discussion. These relative terms are for convenience of description and do not require that the present invention be constructed or operated in a particular orientation.

In the description of the present disclosure, it should be understood that, unless specified or limited otherwise, the terms "mounted", "connected" and "communicated" and variations thereof are used broadly and encompass such as mechanical or electrical mountings, connections and communications, also can be inner mountings, connections and communications of two components, and further can be direct and indirect mountings, connections, and communications, which can be understood by those skilled in the art according to the detail embodiment of the present disclosure.

Reference throughout this specification to "an embodiment", "some embodiments", "one embodiment", "an example", "another example" or "some examples," means that a particular feature, structure, material, or characteristic described in connection with the embodiment or example is included in at least one embodiment or example of the present disclosure. Thus, the appearances of the above phrases in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A gas turbine power generation device, comprising:
    an inlet pipe (1) for allowing air to flow in the gas turbine power generation device;
    a compressor (2), connected to the inlet pipe (1) and having a compressor rotor (4);
    an air storage compartment (3), located downstream of the compressor (2);
    a compressor gear shift (6), having a left end connected to the compressor rotor (4) and a right end connected to a turbine rotor (30);
    a compressor exhaust pipeline (8), connected to the air storage compartment (3);
    a combustion chamber intake pipeline (10), connected to the compressor exhaust pipeline (8);
    a combustion chamber intake cone (11), located in the combustion chamber intake pipeline (10);
    a combustion chamber pneumatic valve (14), located on the combustion chamber intake cone (11);
    a combustion chamber (21), connected to the combustion chamber intake pipeline (10), and having a head provided with a spark plug (19);
    a Tesla turbine (22), located at an outlet of the combustion chamber (21);
    a gas collection compartment (27), located on a side of the Tesla turbine (22);
    an outlet pipe (28), connected to the gas collection compartment (27);
    a generator (33); and
    a generator gear shift (32), having a left end connected to the turbine rotor (30) and a right end connected to the generator (33).

2. The gas turbine power generation device according to claim 1, wherein the Tesla turbine (22) comprises:
    a turbine power disk (23), having a group of equally spaced circular plates with equal diameter and equal thickness;
    the turbine rotor (30), connected to the circular plates through ribs between fan-shaped exhaust holes formed in centers of the circular plates;
    a turbine exhaust gas casing (26), provided with a turbine bearing mounting seat;
    a turbine gas casing (31), having a cylindrical compartment with sealing grate teeth (24) for preventing detonation gas from leaking to a turbine exhaust passage (29) formed by the turbine exhaust gas casing (26) and the turbine gas casing (31);
    the gas collection compartment (27), located on an exhaust side of the Tesla turbine (22); and
    the turbine exhaust passage (29), communicated with the gas collection compartment (27).

3. The gas turbine power generation device according to claim 2, wherein the gas turbine power generation device is configured to:
    suck air into the gas turbine power generation device by the compressor (2) to compress and pressurize the air, and introduce the compressed and pressurized air into the air storage compartment (3);
    feed the compressed and pressurized air into the combustion chamber (21) through the compressor exhaust pipeline (8) and the combustion chamber pneumatic valve (14) in the combustion chamber intake pipeline (10);
    feed a fuel into the combustion chamber intake cone (11) in the combustion chamber intake pipeline (10) by a fuel supplying pipeline (13);
    atomize the fuel in a conical swirl nozzle (18) at a tail of the combustion chamber intake cone (11), and inject the atomized fuel into the combustion chamber (21);
    form a combustible mixture after the air and the fuel are filled in the combustion chamber (21);
    form a detonation combustion wave by igniting the combustible mixture via the spark plug (19) at the head of the combustion chamber (21);

generate a detonation gas by burning the combustible mixture with the detonation combustion wave propagating at a supersonic speed in the combustion chamber (21);

inject the detonation gas into the Tesla turbine (22);

generate turbine power by rotating the turbine power disk (23) via a viscous force of the detonation gas;

discharge an exhausted gas out of the Tesla turbine through the turbine exhaust passage (29), the gas collection compartment (27) and the outlet pipe (28); and output the turbine power to the compressor (2) and the generator (33) in a form of a shaft power.

4. The gas turbine power generation device according to claim 1, wherein a stage level of the compressor (2) is 2 to 3, and the compressor has a pressure ratio of 3 or less.

5. The gas turbine power generation device according to claim 1, wherein the compressor (2) comprises:

the compressor rotor (4), having a cantilever end;

compressor blades, located on the cantilever end of the compressor rotor (4); and a compressor rotor bearing (5), located on an inner cylinder of the air storage compartment (3).

6. The gas turbine power generation device according to claim 1, wherein the air storage compartment (3) comprises:

an inlet;

an expanding annular channel that begins at the inlet and is configured to decelerate and pressurize an air flow from an outlet of the compressor (2); and an annular cavity with a constant cross-section, configured to store compressed air discharged from the compressor (2).

7. The gas turbine power generation device according to claim 1, wherein the compressor exhaust pipeline (8) is a metal round pipeline, and comprises a compressed air flow meter (7) and an air flow controlling valve (9).

8. The gas turbine power generation device according to claim 7, wherein the air flow controlling valve (9) is configured to control an air flow according to a loading of the gas turbine power generation device.

9. The gas turbine power generation device according to claim 1, wherein the combustion chamber intake pipeline (10) has a cavity with a rectangular cross section for introducing air, and the combustion chamber intake cone (11) and the combustion chamber pneumatic valve (14) are located in the combustion chamber intake pipeline (10).

10. The gas turbine power generation device according to claim 1, wherein the combustion chamber intake cone (11) comprises:

a conical head;

a cylindrical main body;

an atomizing air flow channel;

a fuel flow channel; and a conical swirl nozzle (18), communicated to an atomizing air inlet tube (12) via the atomizing air flow channel, and communicated to a fuel supplying pipeline (13) via the fuel flow channel.

11. The gas turbine power generation device according to claim 10, wherein the conical swirl nozzle (18) is configured to break a liquid fuel into droplets under a shearing action of an atomizing air, and spray the droplets into the combustion chamber (21).

12. The gas turbine power generation device according to claim 1, wherein the combustion chamber intake cone (11) is configured to provide a fuel into the combustion chamber (21).

13. The gas turbine power generation device according to claim 1, wherein the combustion chamber pneumatic valve (14) is located at an end of the combustion chamber intake cone (11), and comprises:

an intake orifice plate (16), having a rectangular plate formed with a plurality of air intake holes evenly and equally spaced;

a detonation wave cut-off plate (17), having a rectangular plate; and an intake cup (15), having a rectangular cavity with an opening at one end and holes at the other end.

14. The gas turbine power generation device according to claim 13, wherein when the combustion chamber (21) is filled with fresh air and fuel by the combustion chamber pneumatic valve (14), the detonation wave cut-off plate (17) moves to a downstream direction of airflow under an action of an intake pressure until the detonation wave cut-off plate is stopped by the intake cup (15), the holes of the intake cup (15) are covered and sealed.

15. The gas turbine power generation device according to claim 14, wherein a cavity is formed by a side wall of the intake cup (15) and the combustion chamber intake pipeline (10) to allow the fresh air to be injected to the combustion chamber (21).

16. The gas turbine power generation device according to claim 13, when a back-propagation detonation combustion wave is generated in the combustion chamber (21), the back-propagation detonation combustion wave propagates upstream to the combustion chamber intake pipeline (10), the detonation wave cut-off plate (17) moves to an upstream direction of airflow under an action of a pressure of the detonation combustion back-propagation wave until the detonation wave cut-off plate is stopped by the intake orifice plate (16), and the air intake holes in the intake orifice plate (16) are covered and sealed.

17. The gas turbine power generation device according to claim 1, wherein the combustion chamber (21) has a straight tube cavity having a rectangular cross section, and is provided with a spark plug mounting seat (20) for installing the spark plug (19), and configured to fill and mix air and a fuel to form a combustible mixture.

18. The gas turbine power generation device according to claim 17, wherein the spark plug (19) is configured to ignite the combustible mixture to generate a detonation combustion wave in a propagation direction of airflow.

19. The gas turbine power generation device according to claim 1, wherein the outlet pipe (28) has a straight circular nozzle, and is configured to discharge exhausted gas.

20. A gas turbine power generation method, performed by the gas turbine power generation device according to claim 1.

* * * * *